United States Patent

Serener-Thielmann et al.

(10) Patent No.: US 7,811,078 B2
(45) Date of Patent: Oct. 12, 2010

(54) VENTING DEVICE FOR MOLD

(75) Inventors: Tayfun Serener-Thielmann, Wiesbaden (DE); Boris Klaus Peter Nitsch, Alzenau (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 196 days.

(21) Appl. No.: 12/334,872

(22) Filed: Dec. 15, 2008

(65) Prior Publication Data

US 2010/0148032 A1    Jun. 17, 2010

(51) Int. Cl.
*B29C 33/10* (2006.01)
(52) U.S. Cl. .............. 425/472; 249/141; 425/28.1; 425/812
(58) Field of Classification Search ........... 425/28.1, 425/470, 472, 812; 249/141
See application file for complete search history.

(56) References Cited

U.S. PATENT DOCUMENTS

| 3,374,983 | A | * | 3/1968 | Garretson et al. | 425/812 |
| 4,026,512 | A | * | 5/1977 | Holt | 425/812 |
| 4,081,225 | A | * | 3/1978 | Yaita | 249/141 |
| 4,795,331 | A | * | 1/1989 | Cain et al. | 425/812 |
| 6,561,779 | B2 | | 5/2003 | Nitsch et al. | 425/28.1 |
| 6,808,376 | B2 | | 10/2004 | Serener-Thielmann | 425/28.1 |
| 6,817,848 | B2 | * | 11/2004 | Ishihara | 425/812 |
| 7,125,511 | B2 | | 10/2006 | Serener-Thielmann | 264/326 |
| 7,530,803 | B2 | * | 5/2009 | Seroka | 425/812 |

FOREIGN PATENT DOCUMENTS

| DE | 196 28 166 | * | 1/1998 |
| DE | 198 33 730 A1 | | 2/2000 |
| EP | 1 314 526 A2 | | 5/2003 |
| JP | 2005028589 A | | 2/2005 |

OTHER PUBLICATIONS

European Search Report—Mar. 11, 2010.

* cited by examiner

*Primary Examiner*—James Mackey
(74) *Attorney, Agent, or Firm*—June E. Rickey

(57) ABSTRACT

A mold blocking member for use in a vent bore of a mold for the manufacture of rubber products is provided. The mold blocking member has a tubular hollow body having a first end and a second end, wherein the first end has a cap with an inner portion surrounded by a recessed annular portion, wherein the inner portion is connected to the recessed annular portion by a sidewall, wherein the sidewall has one or more slots therein. The slots opening has a width dimension in the range of about 0.1 mm to about 0.6 mm and a thickness in the range of about 0.03 mm to about 0.15 mm. It is preferred that the inner portion is flat and recessed with respect to the outer rim of the first end.

5 Claims, 3 Drawing Sheets

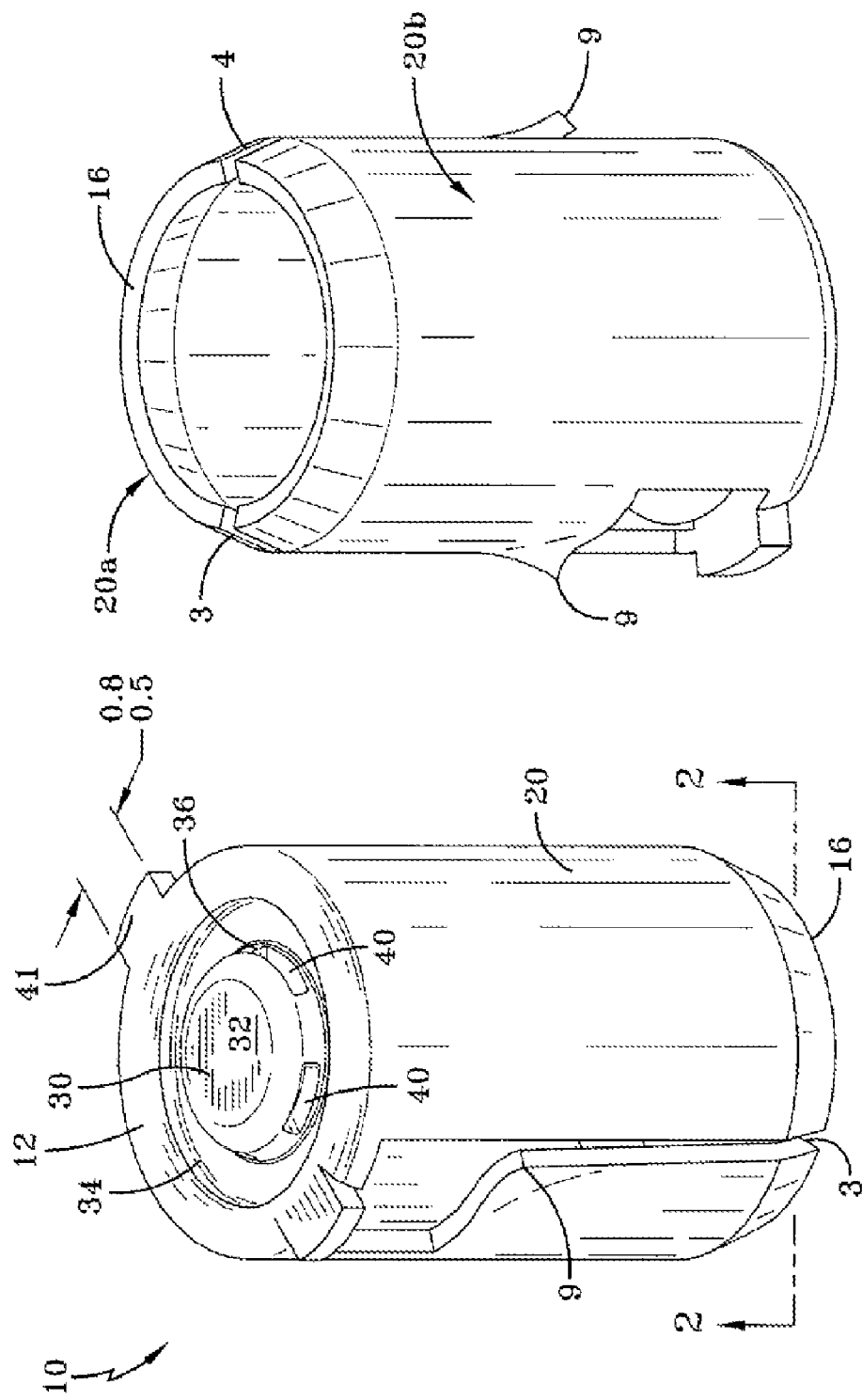

VENTING DEVICE FOR MOLD

FIELD OF THE INVENTION

The invention relates to a blocking member for vent bores in molds for the manufacture of rubber products such as tires. More particularly, the invention is directed to a mold which is equipped with one or more such blocking members.

BACKGROUND OF THE INVENTION

There are generally two types of molds used in the production of rubber articles, such as tires. The first type is the ventless type wherein the mold gasses are vented through tiny cracks in the mold surfaces. The second type of mold is the vented type which comprises a plurality of venting bores in which pins or other devices are inserted to block the flow of rubber while venting the mold. The blocking devices allow the air and mold gasses to vent while preventing the flow of rubber. Without the blocking devices, tiny spues or rubber shoots form on the surface of the article resulting in a hedge hog or bristled appearance. Prior art blocking devices may stop the formation of these rubber shoots, but may result in marks on the surface of the tire. Thus it is desired to have an improved blocking device which allows the gasses to be vented without the formation of rubber shoots and without marks being formed on the tires.

SUMMARY OF THE INVENTION

The invention provides in a first aspect a mold blocking member for use in a vent bore of a mold for the manufacture of rubber products. The mold blocking member has a tubular hollow body having a first end and a second end, wherein the first end has a cap with an inner portion surrounded by a recessed annular portion, wherein the inner portion is connected to the recessed annular portion by a sidewall, wherein the sidewall has one or more slots therein. The slots opening has a width dimension in the range of about 0.1 mm to about 0.6 mm and a thickness in the range of about 0.03 mm to about 0.15 mm. It is preferred that the inner portion is flat and recessed with respect to the outer rim of the first end.

BRIEF DESCRIPTION OF THE DRAWINGS

The invention will be described by way of example and with reference to the accompanying drawings in which:

FIG. 1 is a front, perspective view of a blocking device of the present invention;

FIG. 2 is a bottom perspective view of the blocking device in the direction 2-2 of FIG. 1.

DETAILED DESCRIPTION OF THE INVENTION

Figure 3:
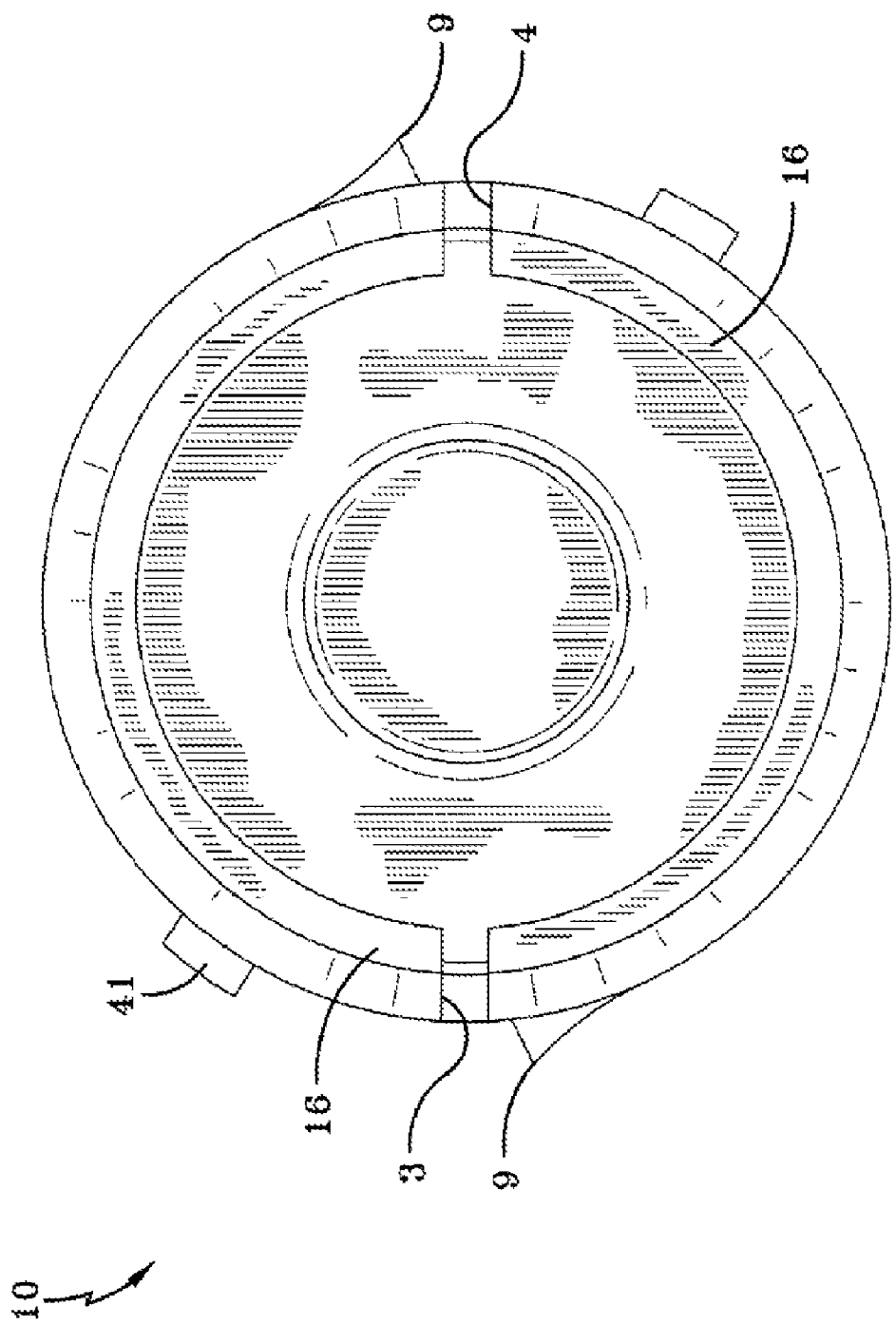
FIG. 3 is an end view of the blocking device in the direction 2-2 of FIG. 1.

FIG. 1 illustrates a blocking member 10 of the present invention. The blocking member 10 comprises a hollow, central body 20 having a first end 12 and a second end 16. The central body 20 is preferably tapered from a first end 12 to a second end 16. The central body 20 further comprises optional barbs 9 which extend like fins from the hollow body and function to secure the blocking device in the vent bores to prevent pullout during demolding.

The central body 20 may be formed of two halves 20a, 20b which are divided by longitudinal openings 3, 4. The openings provide the central body free mobility in the radial direction during insertion of the device into a mold vent bore (not shown). The openings close as the blocking device is inserted into the mold vent bores.

The blocking member 10 is preferably formed from a single thin sheet of metal stock, and may be formed from stamping or punching the metal and then bending the metal into the desired profile. Preferably the blocking member is formed from a one piece sheet of metal. The diameter of the blocking member is about 2.5 to about 3 mm.

The first end of the blocking member 10 comprises a cap 30. The inner portion 32 of the cap in circular and flat, and is surrounded by an annular depression 34. The cap further includes an annular rim 12 that may be flush with the inner portion 32. The rim 12 may further include optional tabs 41 which extend from the rim 12 in order to prevent the blocking member 12 from being pushed too far in the mold bore. A sidewall 36 connects the inner portion 32 to the annular depression 34. The sidewall has one or more slots 40 for venting the mold gasses from the mold. The slots are positioned to be 90 degrees with respect to the flow direction of the rubber to avoid plugging. The slots are sized to have an opening with the smallest dimension or thickness in the range of about 0.05 to about 0.1 mm. The slot openings have a width of about 0.03 to about 0.15 mm. The surface 32 is preferably flush with the outer rim 12.

Figure 4:
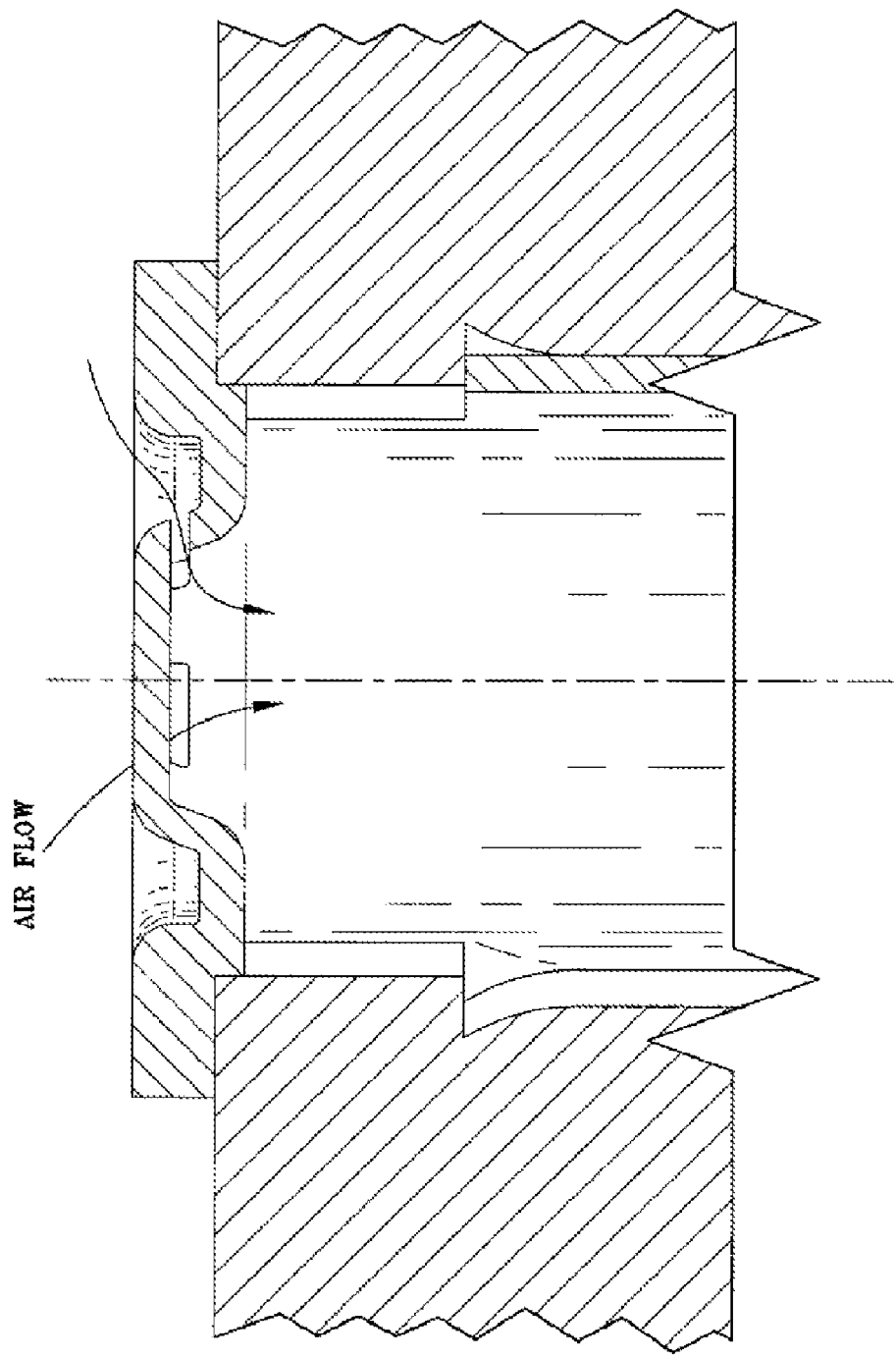
FIG. 4 illustrates the air path of the blocking device inserted in a mold bore.

As shown in FIG. 4, the trapped mold gasses must travel 90 degrees down the sidewalls 36 of the cap surface 32 and then bend another 90 degrees into slots 40. The double bend of the flow path acts as a labyrinth in order to block the rubber from flowing past the cap.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A mold blocking member for use in a vent bore of a mold for the manufacture of rubber products, the mold blocking member comprising: a tubular hollow body having a first end and a second end, wherein the first end has a cap with an inner portion surrounded by a recessed annular portion, wherein the inner portion is connected to the recessed annular portion by a sidewall, wherein the sidewall has one or more slots therein.

2. The mold blocking member of claim 1 wherein the one or more slots each have a minimum dimension in the range of about 0.03 mm to about 0.15 mm.

3. The mold blocking member of claim 1 wherein the one or more slots each have a width dimension in the range of about 0.1 mm to about 0.6 mm.

4. The mold blocking member of claim 1 wherein the inner portion is flat.

5. The mold blocking member of claim 1 wherein the inner portion is recessed with respect to an outer rim of the first end.

* * * * *